United States Patent [19]

Yamaguchi et al.

[11] 4,155,875
[45] * May 22, 1979

[54] METHOD OF SOFTENING CAKED CATALYST

[75] Inventors: Kineo Yamaguchi, Urawa; Katsuhiko Kawakami; Yukimasa Nakamoto, both of Kurashiki, all of Japan

[73] Assignee: Nippon Mining Co., Ltd., Tokyo, Japan

[*] Notice: The portion of the term of this patent subsequent to Jun. 21, 1997, has been disclaimed.

[21] Appl. No.: 780,884

[22] Filed: Mar. 24, 1977

Related U.S. Application Data

[63] Continuation of Ser. No. 597,070, Jul. 18, 1975, abandoned.

[51] Int. Cl.² .................. B01J 23/94; B01J 21/20; C10G 23/02
[52] U.S. Cl. ................ 252/414; 208/48 R; 208/213; 208/216 PP; 252/411 S
[58] Field of Search ........... 252/414, 411, 411 S; 208/48 R, 213, 216; 134/39

[56] References Cited

U.S. PATENT DOCUMENTS

| | | | |
|---|---|---|---|
| 2,370,713 | 3/1945 | Carlson | 252/414 |
| 3,284,344 | 11/1966 | Demeester | 208/216 |
| 3,505,207 | 4/1970 | Haney et al. | 252/414 |
| 3,523,887 | 8/1970 | Hanson | 208/111 |
| 3,565,820 | 2/1971 | Coons, Jr. et al. | 252/414 |
| 3,859,202 | 1/1975 | Brunn et al. | 208/216 |
| 4,031,031 | 6/1977 | Yamaguchi et al. | 252/414 |

Primary Examiner—Patrick Garvin
Assistant Examiner—P. E. Konopka
Attorney, Agent, or Firm—Sughrue, Rothwell, Mion, Zinn and Macpeak

[57] ABSTRACT

A method of softening or loosening caked catalyst pellets used for the desulfurization of a residual oil regardless of the sizes and shapes of the catalyst pellets and without the need of mechanically crushing the caked catalyst comprising contacting the caked catalyst with a washing oil containing an organic amine and/or ammonia gas absorbed therein.

15 Claims, 1 Drawing Figure

METHOD OF SOFTENING CAKED
CATALYST IN A
DESULFURIZATION SYSTEM

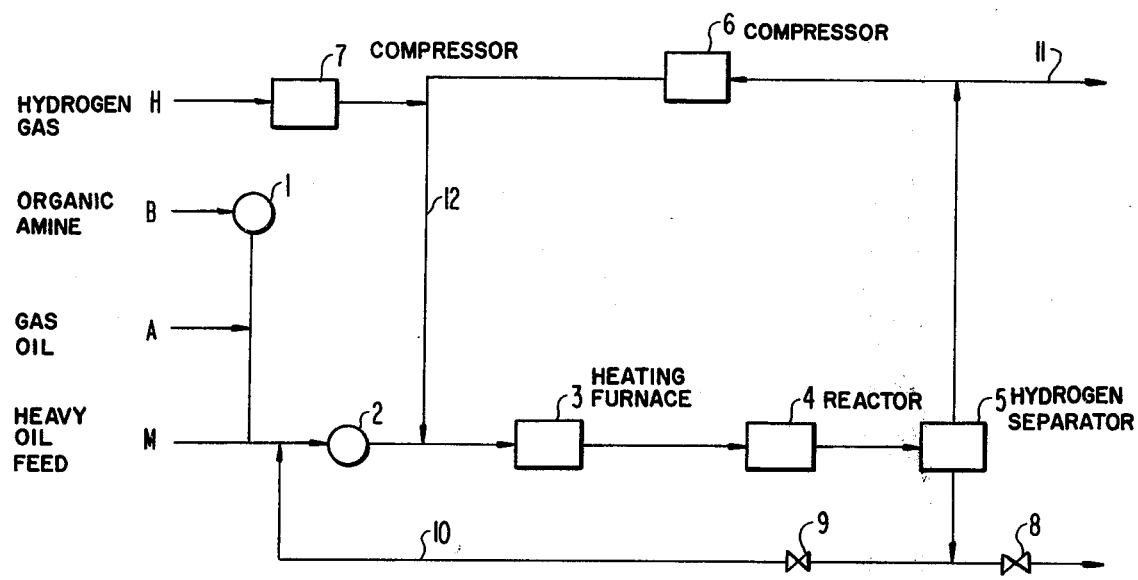
METHOD OF SOFTENING CAKED
CATALYST IN A
DESULFURIZATION SYSTEM

METHOD OF SOFTENING CAKED CATALYST

This is a continuation of application Ser. No. 597,070, filed July 18, 1975, now abandoned.

BACKGROUND OF THE INVENTION

1. Field of the Invention

The present invention relates to a method of softening or loosening catalyst pellets caked and adhered to a catalyst floor or support for facilitating the safe removal of the spent catalyst in a desulfurization system for a residual oil and more particularly it relates to a method of softening or loosening a caked catalyst by washing the caked catalyst using a washing oil containing an organic amine and/or ammonia gas absorbed therein.

In addition, the term "the softening or loosening of caked catalyst" as used herein means the softening of spent catalyst pellets and the loosening or unbinding of these catalyst pellets caked by caking materials as described hereinafter and for the sake of simplicity the term "the softening of caked catalyst" will be used herein.

2. Description of the Prior Art

In general, the removal of a spent catalyst from a desulfurization reaction system has been previously carried out by a method in which the spent catalyst is washed out by circulating a gas oil under suitable temperature and pressure conditions after removing the heavy oil feed from the reaction system or a method in which after washing the spent catalyst with a gas oil and opening the reactor, the caked catalyst in the reactor is mechanically crushed and removed. However, in the method in which a gas oil is circulated through the catalyst, the effect of the method varies depending upon the shape of the catalyst pellets, that is, the method may be effective for the treatment of the catalyst having, for example, a comparatively large particle size but the method is not so effective for softening or loosening the cakes of a catalyst having a small particle size. On the other hand, the mechanical crushing method reduces the quality of the working environment since the crushing operation is usually done manually and a fine dust is formed. Thus, this method is undesirable from the standpoint of safety and health.

As the results of investigations on the reasons causing the catalyst to cake, it has now been found that the caking of catalyst pellets occurs when the spaces among the catalyst pellets are closely filled with carbon, sulfur components, etc., contained in the heavy oil feed during the desulfurization reaction. In particular, it was found that carbon adheres tightly and rigidly to the catalyst pellets as a result of the crystallization of the carbon and also the sulfur components form compounds with iron, vanadium, etc., contained in the heavy oil feed or become dispersed in the carbon in the form of free sulfur which results in the formation of concrete-like caked catalyst pellets. Thus, attempts were made to remove the caking materials filling the spaces between the catalyst pellets of the caked catalyst by washing the caked catalyst with an aqueous alkali metal hydroxide solution and as the result thereof it has been found additionally that the surface of the caked catalyst is water repellent since the surface is covered by carbon, etc., Hence, the catalyst pellet cake is not loosened or the caking material filling the spaces between the pellets is not dissolved out if the caked catalyst is not contacted with the alkali metal hydroxide solution for a long period of time. Moreover, since an alkali metal hydroxide solution partially dissolves the amorphous alumina which is the carrier of the catalyst, the treatment of the spent catalyst and the washings used causes troublesome problems.

SUMMARY OF THE INVENTION

As the results of various investigations and considering that carbon is oleophilic, it has now been discovered that the caked catalyst can be easily loosened and softened by washing the caked catalyst at a high temperature and high pressure with a washing oil containing an organic amine compound and/or ammonia gas absorbed therein.

Thus, according to one embodiment of this invention, a method of softening a caked catalyst in a reactor of a desulfurization system for residual oils is provided which comprises, during or immediately after removing the feed oil from the reactor, washing the catalyst pellets in the caked state in the reactor with a washing oil containing an organic amine.

Also, according to another embodiment of this invention, a method of softening a caked catalyst in a reactor of a desulfurization system for residual oils is provided which comprises, during or immediately after removing the feed oil from the reactor, washing the catalyst pellets in the caked state in the reactor with a washing oil containing ammonia gas absorbed therein.

According to an even further embodiment of the present invent, a method of softening a caked catalyst in a reactor of a desulfurization system for residual oils is provided which comprises, during or immediately after removing the feed oil from the reactor, washing the catalyst pellets in the caked state in the reactor with a washing oil containing an organic amine and ammonia gas absorbed therein.

BRIEF DESCRIPTION OF THE DRAWING

The FIGURE is a schematic illustration of a desulfurization system for a heavy oil incorporating the process of this invention as used in the Example.

DETAILED DESCRIPTION OF THE INVENTION

The term "washing oil" as used herein means materials having a boiling point the same as or lower than that of the feed oil used, which include kerosene (b.p. about 160° to 220° C.), gas oil (b.p. about 200° to 400° C.), and atmospheric residual oil (b.p. about 300° C. of higher).

The catalysts to which the method of this invention can be applied include a wide range of catalysts used for catalytic reactions of hydrocarbons, for example, catalysts for the desulfurization of gasoline and kerosene, catalysts for the desulfurization and/or cracking of gas oils, and catalysts for the desulfurization and/or cracking of atmospheric residual oils and vacuum residual oils. More specifically, suitable examples of catalysts to which the process of this invention is applicable include a Co-Ni-Mo catalyst and a Co-Mo catalyst, supported on alumina or silica-alumina, and the like, as disclosed in U.S. Pat. Nos. 2,880,171 and 3,383,301.

Moreover, the catalysts which can be used may be either spherical or cylindrical. Where the catalyst particles have a spherical shape, particles having a diameter of about ⅛ to 1/32 inches can be suitably processed in this invention, and where the catalysts particles have a cylindrical shape, particles having a diameter of about ⅛ to 1/32 inches and a length of about ¼ to ⅛ inches can be suitably processed in this invention.

The term "high temperature and high pressure condition" as used herein means operation conditions usually employed, e.g., a temperature of about 150° to 400° C. and a pressure of about 50 to 200 kg/cm$^2$.G.

As described above, in one embodiment of this invention, an organic amine is present in the washing oil and since an organic amine has surface active properties and complexing properties and also has the effect of restraining the formation of sulfur compounds and chlorides of metals and thus preventing the corrosion of the metallic materials constituting the reactor, the caked catalyst in the reactor can be softened or loosened at high efficiency without damaging the apparatus according to the method of this invention.

In one embodiment of this invention a washing oil containing about 0.005 to 20% by weight of one or more organic amine compounds such as aliphatic amines, aromatic amines, etc., is used for washing the catalysts. If the content of the organic amine is lower than about 0.005% by weight, the caking materials filling the spaces of the catalyst pellets tend to dissolve in the washing oil with difficulty, while if the content of the organic amine is higher than about 20% by weight, no further improvement in the washing effect is obtained and thus the use of a higher organic amine content is disadvantageous from an economical view point. Furthermore, a better result is generally obtained when the content of the organic amine or amines in the washing oil is about 1 to 5% by weight. Suitable examples of organic amines which can be used include amines such as, for example, diethylenetriamine, triethylenetetramine, benzylamine, succinimide, etc.

When a gas oil is used as the washing oil in this invention, the gas oil has the characteristics that 90% of the oil has a distillation temperature lower than about 350° C. but since the washing oil is used at a high temperature and high pressure in the method of this invention, this characteristic is not particularly significant and any washing oil which can be mixed with an organic amine at room temperature (e.g., about 20°-30° C.) can be used.

After the operation of the desulfurization system is stopped, the washing oil is heated to temperature at which the washing oil does not cause a hydrogenation reaction to occur and the washing oil is introduced into the desulfurization reactor while reducing the feeding amount of the feed oil. The feed amount of the feed oil is further reduced while increasing the feed amount of the washing oil and finally the feeding of the feed oil is completely stopped. The washing oil replaces the feed oil during the passage thereof through the catalyst layer. Since the washing oil passing through the catalyst layer dissolves metal sulfides and tars having a high viscosity and is contaminated by these materials, a fresh washing oil is supplied thereto until the content of the contaminants in the total washing oil in the system becomes less than about 2% by weight, as sulfur.

When the content of the contaminants in the total washing oil becomes sufficiently low, the supply of the fresh washing oil is stopped and after changing the system into a system in which the washing oil is circulated for washing the catalyst, the organic amine as described above is added to the washing oil. The organic amine can be previously added to the washing oil prior to the supply of the washing oil to the system or the washing oil can be supplied to the system while adding the organic amine to the washing oil but preferably the organic amine is added to the washing oil which is supplied to the system after replacing the feed oil in the system with a washing oil which does not contain any organic amine. In this case, hydrogen gas is, as a matter of course, circulated through the system until the washing operation for the catalyst is completed.

The circulation of the organic amine-containing washing oil for washing the catalyst is preferably carried out for a long period of time, usually for about 8 to 20 hours. That is, the organic amine-containing washing oil is circulated in an amount of about 50 to 100% by volume of the feed amount per hour over a period of about 8 to 20 hours. Then, while the amount of the washing oil supplied is reduced or the supply of the washing oil supplied is completely stopped, the washing oil is removed from the system, and the temperature and pressure of the system are reduced to ambient temperature and atmospheric pressure, respectively, to stop the softening operation of the caked catalyst. Thereafter, the hydrogen gas in the system is replaced with nitrogen gas.

The above explanation of this invention was described with respect to the use of a washing oil containing an organic amine but a similar result as above can be also obtained by using a washing oil having ammonia gas absorbed therein according to another embodiment of this invention. The content of ammonia gas in the washing oil used in this invention ranges from about 0.005 to 20% by weight, as in the case of using an organic amine, and also the supply of the washing oil containing the ammonia gas, the removal of the feed oil, the washing period of time, and the removal of the washing oil used from the system are substantially the same as those in the case of using the washing oil containing the organic amine as described above. Thus, in the practice of the washing operation for the caked catalyst of this invention, any one of the two methods described above can be selectively employed according to the actual operations. Similarly, the organic amine and the ammonia gas can be used in combination.

The invention is described below in greater detail but it will be understood that the following description is for the purpose of illustration of this invention and the invention is not to be construed as being limited thereto in any way.

EXAMPLE

As schematically illustrated in the accompanying drawing, in a conventional operation of a desulfurization system for a heavy oil, the heavy oil feed M is compressed by means of a pump 2 and charged in a reactor 4 filled with a desulfurization catalyst through a heating furnace 3 together with hydrogen gas H passed through a line 12. The heavy oil is desulfurized in the reactor and the unreacted hydrogen gas and the heavy oil having a reduced sulfur component content are separated from each other in a separation vessel 5. The hydrogen gas thus separated is compressed by means of a compressor 6 and is combined with the make-up hydrogen gas compressed by means of a compressor 7 and supplied to the reactor through the pipe line 12. When the desulfurization process is continued over a certain period of time, the desulfurization catalyst gradually loses its catalytic activity and the pressure difference in the catalyst bed increases gradually as the desulfurization progresses, which makes it impossible to further continue the normal operation of the desulfurization system. In such a case, the operation of the desulfurization system must be stopped and the catalyst in the reactor renewed.

The present invention is applied to the desulfurization system in such a case. That is, on stopping the operation of the desulfurization system, the temperature of the reactor 4 is reduced while reducing the feed amount of the heavy oil M and when the temperature of the reactor has reached 320° C., a gas oil A is compressed by means of a pump 2, heated to 220° C. in a heating furnace 3, and introduced into the reactor 4 together with hydrogen gas sent through the pipe line 12 and also heated in the heating furnace 3 together with the gas oil for washing the caked catalyst thus used in the desulfurization while maintaining the temperature of the system at 220° C. and the pressure at the normal operation pressure. The amount of the gas oil A thus introduced is substantially the same as the amount of the heavy oil in normal operation. The washed oil thus used for washing the catalyst and separated in the separation vessel 5 is sampled and analyzed. While the content of the sulfur component of the oil is above a certain value, the washing oil is removed through an open valve from the system but when the content of the sulfur component is found to be below 1.5% by weight, the valve 8 is closed and valve 9 is opened, whereby the washing oil containing the reduced amount of sulfur component is circulated through the valve 9 and a pipe line 10 for washing the catalyst while stopping the supply of the gas oil A. Then, diethylenetriamine B which is soluble in water and oils is added to the circulating gas oil by means of a pump 1 so that the content of the amine in the oil becomes 1% by weight. The gas oil thus containing diethylenetriamine is circulated through the system for 20 hours for washing the spent catalyst. Thereafter, the valve 8 is opened to remove slowly the washing oil thus used and to stop the circulation of the gas oil through the washing system. The operation is then shut down and, the catalyst used in the desulfurization system is softened or loosened, and the spent catalyst thus treated can be readily removed from the reactor.

The above-described washing operation is also effectively carried out by using a gas oil containing an organic amine other than diethylenetriamine or further by using a gas oil having ammonia gas absorbed therein or a gas oil having an organic amine and ammonia gas absorbed therein in place of the organic amine-containing gas oil.

While the invention has been described in detail and with reference to specific embodiments thereof, it will be apparent to one skilled in the art that various changes and modifications can be made therein without departing from the spirit and scope thereof.

What is claimed is:

1. A method of softening a caked catalyst in a reactor in a desulfurization system for a residual oil which comprises, while removing or immediately after removing the residual oil in the reactor, introducing at a high temperature and pressure a washing oil containing at least about 0.005% by weight of an aliphatic or aromatic amine into the reactor and circulating the washing oil containing the organic amine through the system to wash the caked catalyst, said high temperature and pressure being such that hydrogenation of the oil does not occur.

2. The method as claimed in claim 1, wherein said organic amine is diethylenetriamine, triethylenetetramine, or benzylamine.

3. The method as claimed in claim 1, wherein the content of the organic amine in the washing oil ranges from about 0.005% by weight to about 20% by weight.

4. The method as claimed in claim 1, wherein said method includes passing a washing oil through the catalyst in the reactor until the sulfur content of the washing oil passed through the reactor is lower than about 1.5% by weight and then circulating said washing oil containing the organic amine through the system for washing the caked catalyst in the reactor.

5. The method as claimed in claim 1, wherein said method includes circulating hydrogen gas together with the washing oil.

6. The method as claimed in claim 1, wherein said washing oil has a boiling point about the same as or lower than that of the residual oil.

7. The method of claim 1, wherein said high temperature is 150° C. to 400° C. and said high pressure is 50 to 200 kg/cm$^2$.G.

8. The method of claim 1, wherein said containing washing oil is circulated in an amount of 50 to 100% by volume of the feed amount per hour for a period of 8 to 20 hours.

9. The process of claim 1, wherein said washing oil containing amine is introduced after removing the residual oil from the reactor.

10. A method of softening a caked catalyst in a reactor in a desulfurization system for a residual oil which comprises, while removing or immediately after removing the residual oil in the reactor, introducing at a high temperature and pressure a washing oil containing at least about 0.005% by weight of succinimide into the reactor and circulating the washing oil containing the succinimide through the system to wash the caked catalyst, said high temperature and pressure being such that hydrogenation of the oil does not occur.

11. The method of claim 10, wherein the content of the succinimide in the washing oil ranges from about 0.005% by weight to about 20% by weight.

12. The method of claim 10, wherein said method includes passing a washing oil through the catalyst in the reactor until the sulfur content of the washing oil passed through the reactor is lower than about 1.5% by weight and then circulating said washing oil containing succinimide through the system for washing the caked catalyst in the reactor.

13. The method of claim 10, wherein said method includes circulating hydrogen gas together with the washing oil.

14. The method of claim 10, wherein said high temperature is 150° C. to 400° C. and said high pressure is 50 to 200 kg/cm$^2$·G.

15. The method of claim 10, wherein said succinimide containing washing oil is circulated in an amount of 50 to 100% by volume of the feed amount per hour for a period of 8 to 20 hours.

* * * * *